June 16, 1942.  D. M. SCHWARTZ  2,286,873
CONTROLLER FOR MULTIPLE CLUTCHES
Filed April 4, 1941
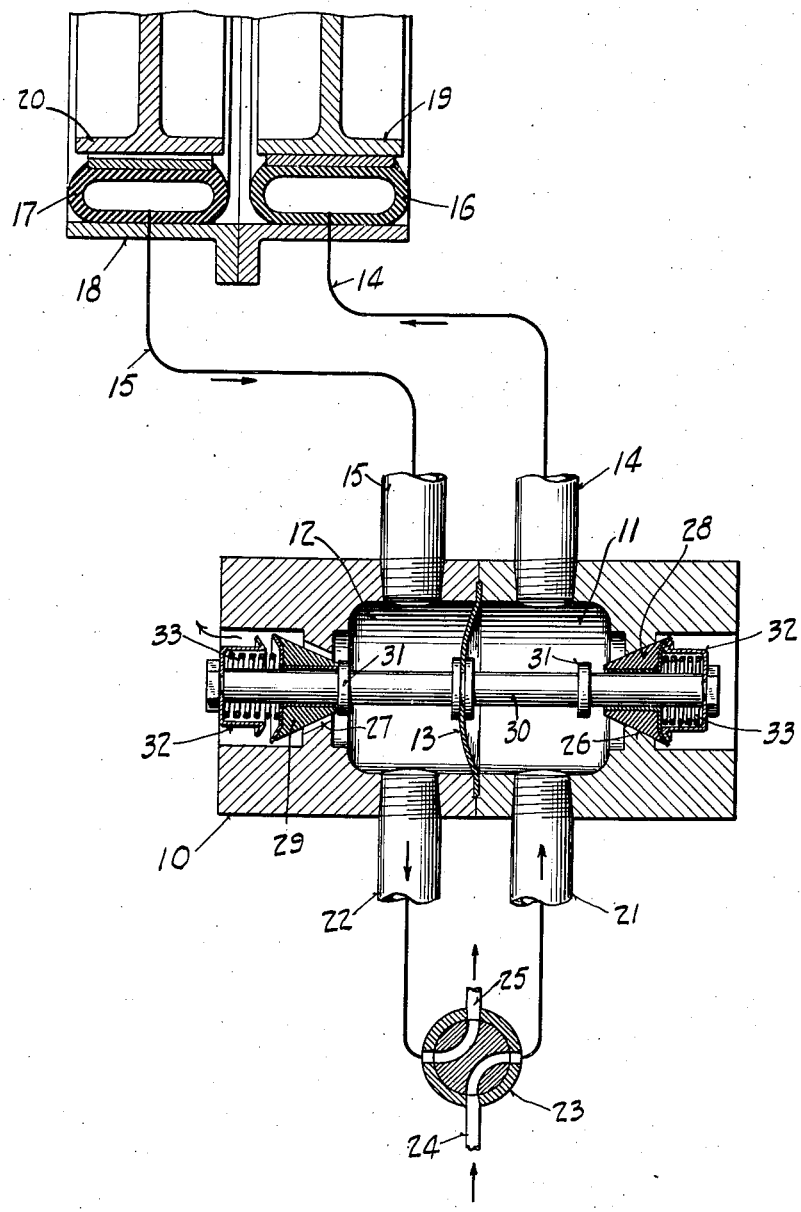
Daniel M. Schwartz
INVENTOR.
BY
ATTORNEY.

Patented June 16, 1942

2,286,873

UNITED STATES PATENT OFFICE 2,286,873

CONTROLLER FOR MULTIPLE CLUTCHES

Daniel M. Schwartz, Pittsburgh, Pa., assignor to The Falk Corporation, Milwaukee, Wis., a corporation of Wisconsin Application April 4, 1941, Serial No. 386,767

6 Claims. (Cl. 192—87)

This invention relates to multiple clutch controls and is applicable particularly to power transmissions of the type disclosed in the copending application of Walter P. Schmitter, Serial No. 301,930, filed October 30, 1939.

The transmission disclosed in said application involves two fluid pressure clutches alternatively operable to effect forward or reverse operation of the transmission, each clutch including a gland which may be inflated to close the clutch or deflated to open the same.

An object of the present invention is to provide a control system which will prevent inflation of either clutch gland while the other is inflated.

Other more specific objects and advantages will appear from the following description of an illustrative embodiment of the present invention.

The single figure of the accompanying drawing is a diagrammatic illustration of a control system constructed in accordance with the present invention.

The control system selected for illustration comprises a housing 10 having two chambers 11 and 12 therein separated by an appropriate pressure responsive element, such as a flexible diaphragm 13. The chambers are connected through suitable separate connections 14 and 15, respectively, with the glands 16 and 17 of a pair of fluid pressure clutches of the type disclosed in the application hereinabove identified.

In this instance the gland 16 constitutes a part of the forward clutch, and gland 17 a part of the reversing clutch. Both glands are carried by the same outer clutch ring 18 and are inflatable into gripping engagement with separate inner clutch rings 19 and 20 respectively.

The chambers 11 and 12 are also connected through suitable separate connections 21 and 22, respectively, with an appropriate four-way valve 23 through which fluid pressure may be directed into either chamber from a pressure supply pipe 24 while the other chamber is open to an exhaust pipe 25.

Each chamber 11 and 12 is also equipped with a vent port 26 or 27 coaxially disposed at the outer end thereof, both ports being controlled by separate inwardly closing valves 28 and 29 slidably mounted upon a rod 30 extending axially through both chambers and their respective exhaust ports. Each valve 28 and 29 is limited in its movements along the rod 30 by an inner stop shoulder 31 on the rod and by a housing 32 attached to an outer end of the rod, and each valve is urged inwardly by a spring 33 disposed within each housing 32. The rod is fixed to the diaphragm 13 for lengthwise movement therewith.

The arrangement is such that both springs 33 react to urge their adjacent valves toward closed position and to yieldably retain the rod 30 in an intermediate neutral position so long as there is no pressure in either chamber 11 or 12. But when fluid pressure is supplied to either chamber, such as chamber 11, for instance, the diaphragm 13 and rod 30 are forced to move in such direction as to shift the valve 29 of the other chamber into open position and to further compress that spring 33 which is behind the closed valve. The other chamber 12 is thus vented through its port 27. Such are the positions of the parts when the clutch gland 16 is inflated into clutch closing position by the fluid pressure transmitted from the supply pipe 24 through the valve 23 and chamber 11.

Thereafter, when the valve 23 is shifted in a manner to connect chamber 12 with the supply pipe 24 and chamber 11 with the exhaust pipe 25, the fluid entering the chamber 12 is initially free to escape through the open vent port 27, thereby preventing immediate transmission of fluid pressure to the clutch gland 17. Although chamber 11 is at the same time opened to the exhaust pipe 25, a brief interval of time is required to materially reduce the pressure in the chamber 11 because of the flow of fluid therein from the inflated clutch gland 16. The pressure thus momentarily maintained in the chamber 11 acts against the diaphragm 13 to hold the rod 30 in the position shown against the pressure of that spring 33 behind the valve 28, and this condition prevails until the fluid pressure against the diaphragm has become so reduced as not to be able to overcome the pressure of said spring 33, whereupon the rod 30 shifts toward the right and carries the other valve 29 into closed position.

When the port 27 is thus closed by the valve 29, the fluid supplied through the pipe 22 passes through the chamber 12 to the clutch gland 17 to inflate the latter, and as the pressure builds up in the gland 17 and chamber 12, the diaphragm 13 is ultimately flexed and the rod 30 thereby shifted to force the valve 28 into open position and to compress that spring 33 behind the closed valve 29. This condition maintains until the valve 23 is again shifted to connect chamber 11 with the supply pipe 24 and chamber 12 with the exhaust pipe 25, whereupon the parts again function in a manner similar to that above described to delay transmission of fluid pressure to the clutch gland 16 until the pressure in the clutch 17 and chamber 12 has been reduced to a degree dependent upon the degree of pressure in that spring 33 behind the valve 29.

It will thus be noted that a control system has been provided which will insure at least partial deflation of one clutch gland before the other is exposed to fluid pressure and which will insure continued deflation of the one while inflation of the other is in progress, thereby insuring prompt inflation of either, but only after deflation of the other is assured.

Various changes may be made in the embodiment of the invention hereinabove specifically described without departing from or sacrificing the advantages of the invention as defined in the appended claims.

I claim:

1. The combination with two fluid pressure receiving members, of means for supplying fluid pressure to either of said members alternatively and for opening the other of said members to exhaust, and vent means for preventing transmission of fluid pressure to either of said members until a time interval after the other of said members has been opened to exhaust.

2. The combination with two fluid pressure receiving members, of valve means operable to direct fluid pressure to either of said members alternatively and to exhaust fluid from the other of said members, and vent means interposed between said members and valve means for preventing transmission of fluid pressure to either of said members until a time interval after the other of said members has been opened to exhaust.

3. The combination with two fluid pressure receiving members, of means for supplying fluid pressure to either of said members alternatively and for opening the other of said members to exhaust, and vent means responsive to the fluid pressure in either of said members for delaying the supply of fluid pressure to the other of said members.

4. The combination with two pressure receiving members, of means for supplying fluid pressure to either of said members alternatively, and vent means responsive to the fluid pressure in either of said members for delaying transmission of fluid pressure to the other of said members.

5. The combination with two pressure receiving inflatable members, of means for supplying fluid pressure to either of said members to inflate the same alternatively, means responsive to the transmission of fluid pressure to either of said members for opening the other of said members to exhaust, and pressure responsive means for maintaining said other member open to exhaust until the pressure in the inflated member has been materially reduced.

6. The combination with two pressure receiving inflatable members, of means for supplying fluid pressure to each of said members alternatively and for opening the other of said members to exhaust, additional vent means for each of said members, and means responsive to an increase in fluid pressure in either of said members for opening said vent means of the other of said members and also responsive to a fall in pressure in either of said members for closing the vent means of the other of said members.

DANIEL M. SCHWARTZ.